Feb. 15, 1927. 1,617,839
C. H. FENNELL
WHEEL CHOCK
Filed Dec. 26, 1925

Inventor
Charles H. Fennell.
By
Attorneys

Patented Feb. 15, 1927.

1,617,839

UNITED STATES PATENT OFFICE.

CHARLES H. FENNELL, OF DETROIT, MICHIGAN.

WHEEL CHOCK.

Application filed December 26, 1925. Serial No. 77,771.

This invention relates to wheel chocks and has special reference to that class of wooden blocks which are placed against the wheels of an automobile to prevent accidental shifting of the automobile on a floor or other support, particularly during shipment of the automobile from the manufacturer to the distributor or user. It is the present practice to use tire engaging blocks having end extensions which are nailed, spiked or otherwise secured to a car floor but such securing means is often times ineffective and the blocks laterally shift and become loose.

My invention aims to provide additional securing means for anchoring wheel chocks in place so that the chocks cannot become accidentally displaced. The additional securing means add very little expense to the chocks and can be easily and quickly installed.

My invention will be hereinafter specifically described and then claimed, and reference will now be had to the drawing, wherein—

Figure 1:
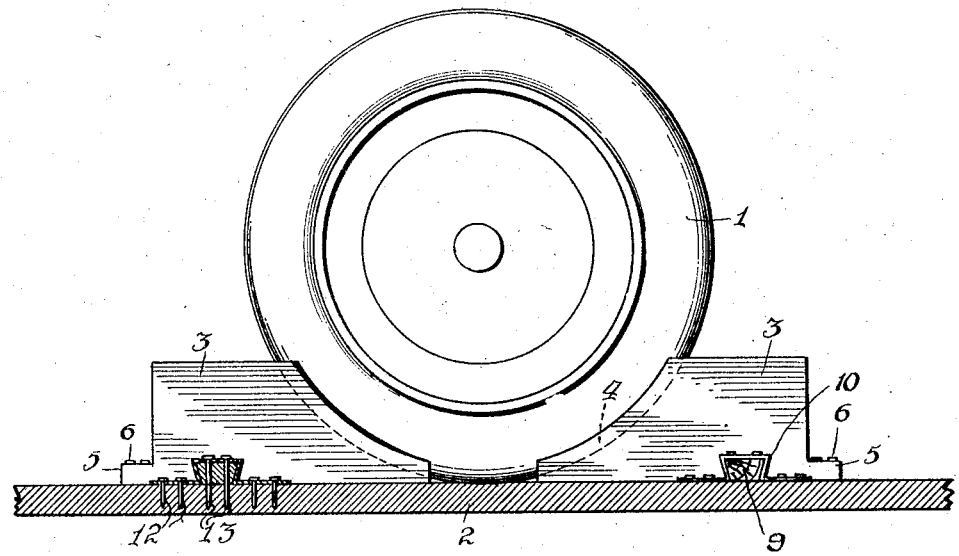
Figure 1 is a side elevation of a wheel retained in place by a set of chocks secured to a floor.
Figure 2:
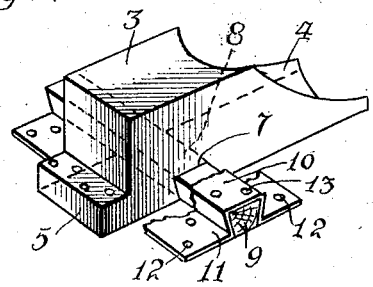
Fig. 2 is a perspective view of one of the chocks or blocks.
Figure 3:
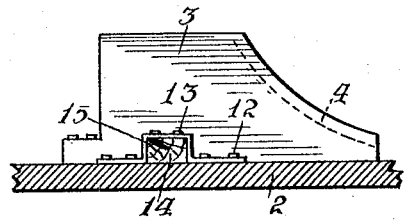
Fig. 3 is a side elevation of a block illustrating another form of securing means.

Reference will first be had to Figs. 1 and 2, showing an automobile wheel 1 resting on a car floor or other support 2 and to retain the wheel in place against accidental shifting on the floor 2, a set of blocks 3 are employed, said blocks having concave or grooved tire engaging faces 4 with the outer ends of the blocks provided with extensions 5 adapted to be secured to the floor 2 by nails 6, spikes or other fastening means. These blocks are ordinarily made of wood and my invention resides in providing additional retaining or securing means for the blocks.

Each block is provided with a transverse dove-tailed groove 7 in its lower face and mounted in the groove is a transversely disposed bar 8 having its ends protruding from the sides of the block to form lateral side projections 9. Fitted on these side projections are the dove-tailed portions 10 of straps 11 and said straps extend in a general direction of the block 3 and are adapted to be secured to the floor 2 by nails 12, spikes or other fastening means. Similar fastening means 13 may extend through the straps and the ends of the bar.

Instead of using a dove-tailed bar I may use a bar 14 substantially rectangular in cross section with said bar fitting in a correspondingly shaped groove in the block 3. Straps 15 may be mounted over the ends of the bar 14 and secured to the block 2 by the same fastening means 12 and 13 heretofore mentioned.

Figure 4:
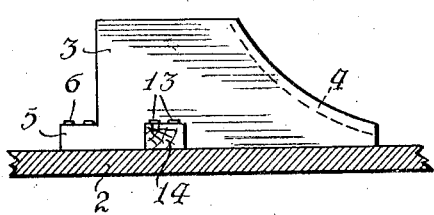
Fig. 4 is a similar view showing a simple form of securing means.
Figure 5:
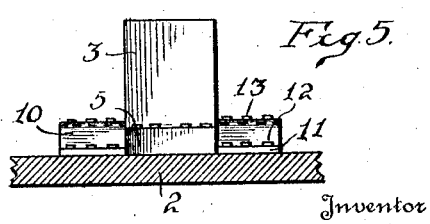
Fig. 5 is an end view of the structure shown in Fig. 3.

In some instances the straps 11 and 15 may be dispensed with and the ends of the bars 8 or 14 nailed or otherwise secured to the floor 2, as shown in Fig. 4. After the blocks 3 have been properly positioned relative to the wheel 1 and secured in place on the floor 2, the bars 8 or 14 may be placed in the blocks 3 and secured to the floor, or if straps are used on the ends of the bar said straps can be easily placed in position and secured to the floor.

My additional fastening means affords positive and reliable securing means for the wheel blocks or chocks, and it is to be understood that the construction is susceptible to such changes as are permissible by the appended claims.

What I claim is:—

1. In a wheel chock adapted to be anchored on a floor adjacent a wheel, a detachable bar in the lower face of said chock and having its ends protruding from said chock, and means engaging the bar ends adapted to anchor said bar to the floor.

2. A wheel chock comprising a wheel engaging block having side lateral projections adapted for anchoring the block on a surface, said lateral projections being connected and adapted for movement transversely of said block.

3. A wheel chock comprising a wheel engaging block having its lower face grooved, a bar mounted in the block groove and adapted to have its ends anchored on a surface, and straps fitting on the ends of said bar and adapted to be secured to a floor.

4. A wheel chock comprising a wheel engaging block having its lower face provided with a dove-tail transverse groove, a bar fitted in the block groove with the ends of the bar protruding from the sides of the block, and straps fitted on the ends of said bar, said straps having the ends thereof secured to a wheel sustaining surface.

5. A wheel chock comprising a block having a tire engaging end and a securing end by which said block may be anchored on a floor, and detachable means intermediate the ends of said block and in a plane with the securing end of said block adapted to be anchored on the floor to hold said block on the floor independent of the securing end of said block.

6. Wheel chocking means comprising opposed wheel engaging blocks having lateral projections, and means extending over said block projection in the general direction of the blocks and parallel thereto adapted for anchoring the projections of said blocks.

In testimony whereof I affix my signature.

CHARLES H. FENNELL.